United States Patent

[11] 3,578,959

| [72] | Inventors | Donald W. Perkins<br>Dewitt, N.Y.;<br>William E. Wickes, Manhattan Beach, Calif. |
|---|---|---|
| [21] | Appl. No. | 692,889 |
| [22] | Filed | Dec. 22, 1967 |
| [45] | Patented | May 18, 1971 |
| [73] | Assignee | General Electric Company |

[54] DIGITAL RESOLVER WITH ALTERNATELY PHASED DIGITAL DIFFERENTIAL ANALYZERS
8 Claims, 9 Drawing Figs.

[52] U.S. Cl. .................................................. 235/152, 235/150.31, 235/150.53
[51] Int. Cl. ................................................. G06f 7/38, G06f 15/32, G06f 15/24
[50] Field of Search ........................................... 235/152, 189, 150.53, 150.3, 150.31; 343/5 (DP)

[56] References Cited
UNITED STATES PATENTS

| 2,874,903 | 2/1959 | Bock et al. | 235/189X |
| 2,995,302 | 8/1961 | Ingwerson et al. | 235/152 |
| 3,028,092 | 4/1962 | Fay | 235/189 |
| 3,180,976 | 4/1965 | Robinson | 235/189 |
| 3,262,109 | 7/1966 | Swale et al. | 343/5(DP)X |

*Primary Examiner*—Malcolm A. Morrison
*Assistant Examiner*—James F. Gottman
*Attorneys*—Carl W. Baker, Melvin M. Goldenberg, Frank I. Neuhauser and Oscar B. Waddell ABSTRACT: A resolver is described for transforming position vectors from polar to Cartesian coordinates and resolving such vectors into orthogonally related components defined by sine and cosine functions of the vector angle. This transformation is accomplished digitally in the systems as described using digital differential analyzers which iteratively sum or extrapolate the sine and cosine functions in steps each taken in response to an input pulse representing a small increment of vector angle. For purposes of optimized accuracy the sine and cosine functions are sequentially incremented by extrapolating a first of the two functions using present values of both and extrapolating the other using the extrapolated value for the first. This sequence is reversed with each input pulse, and is effected by time delay and/or anticipation means operative to differentially phase the sine and cosine extrapolations and to alternate the order or sequence in which they are computed.

Patented May 18, 1971
3,578,959
4 Sheets-Sheet 1
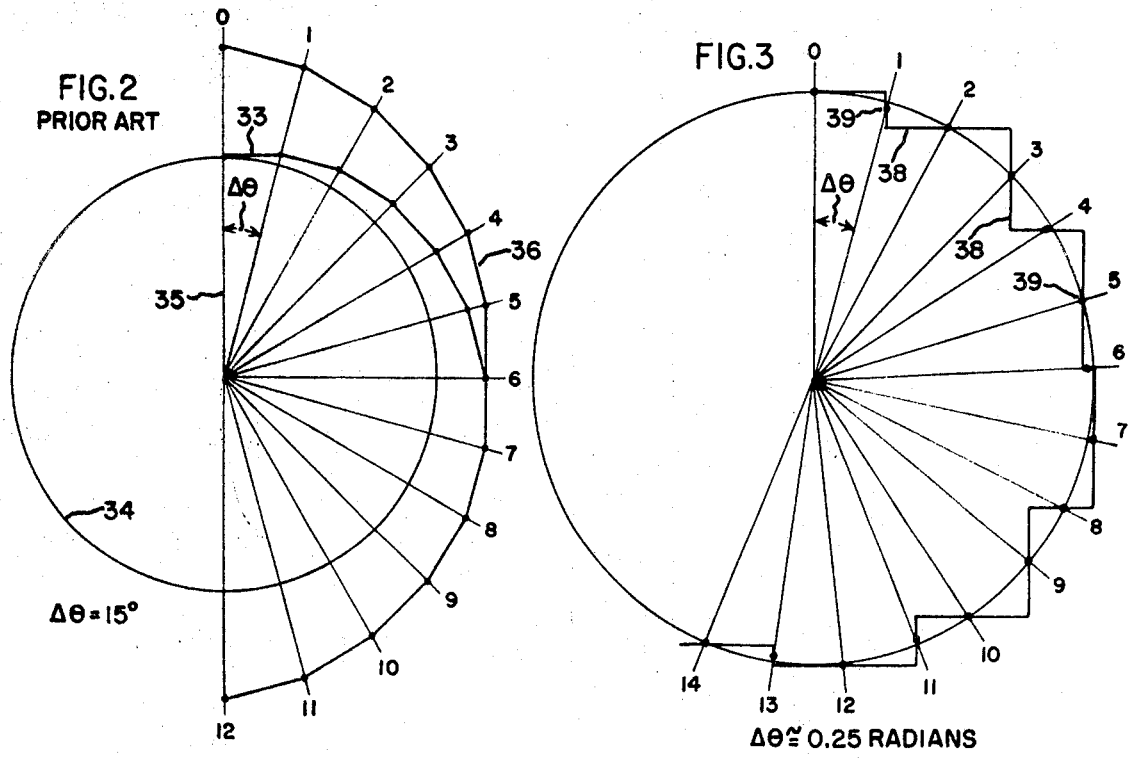
FIG.2 PRIOR ART
$\Delta\theta = 15°$
FIG.3
$\Delta\theta \cong 0.25$ RADIANS
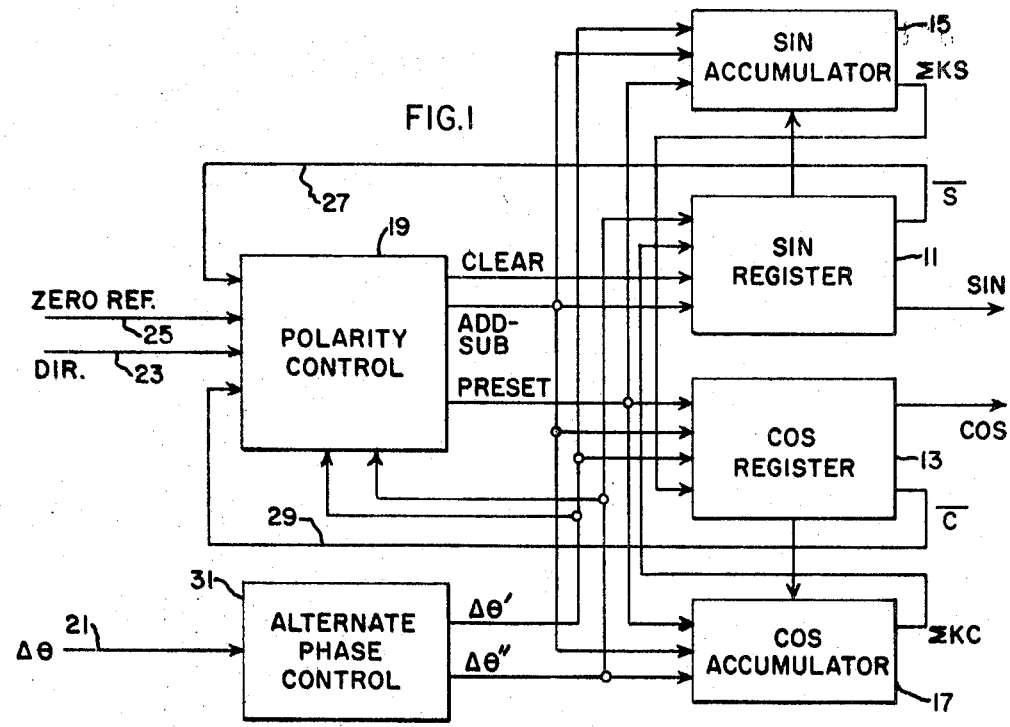
FIG.1
INVENTORS:
DONALD W. PERKINS,
WILLIAM E. WICKES,
BY C W Baker
THEIR ATTORNEY.

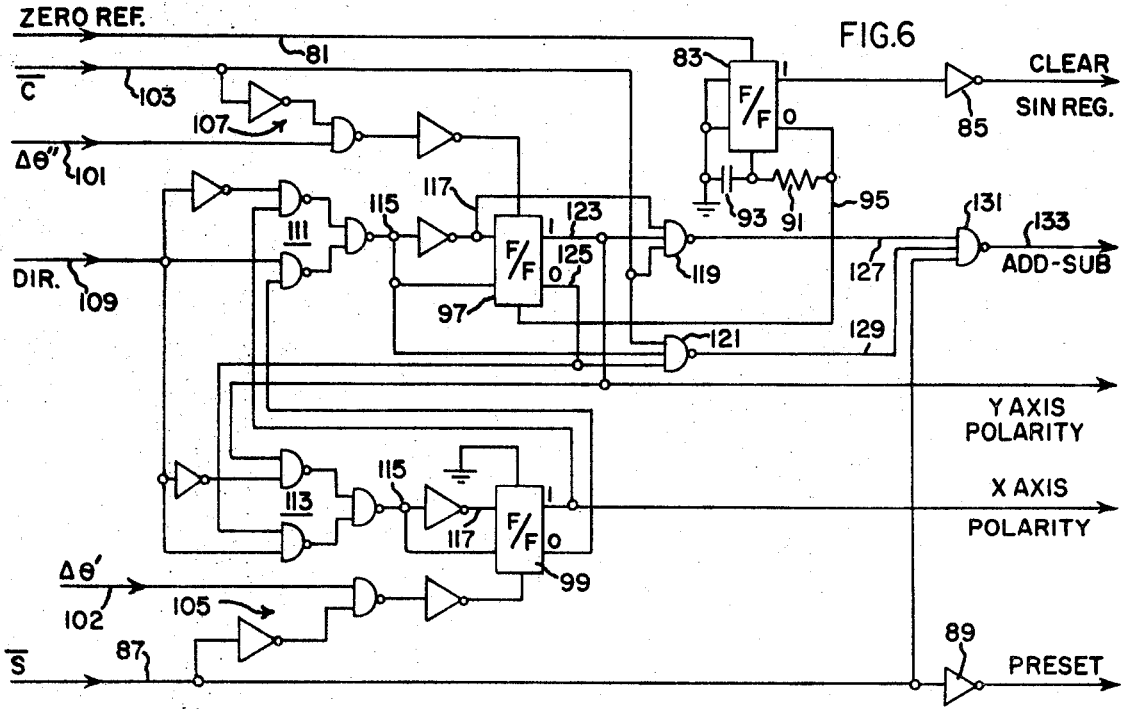
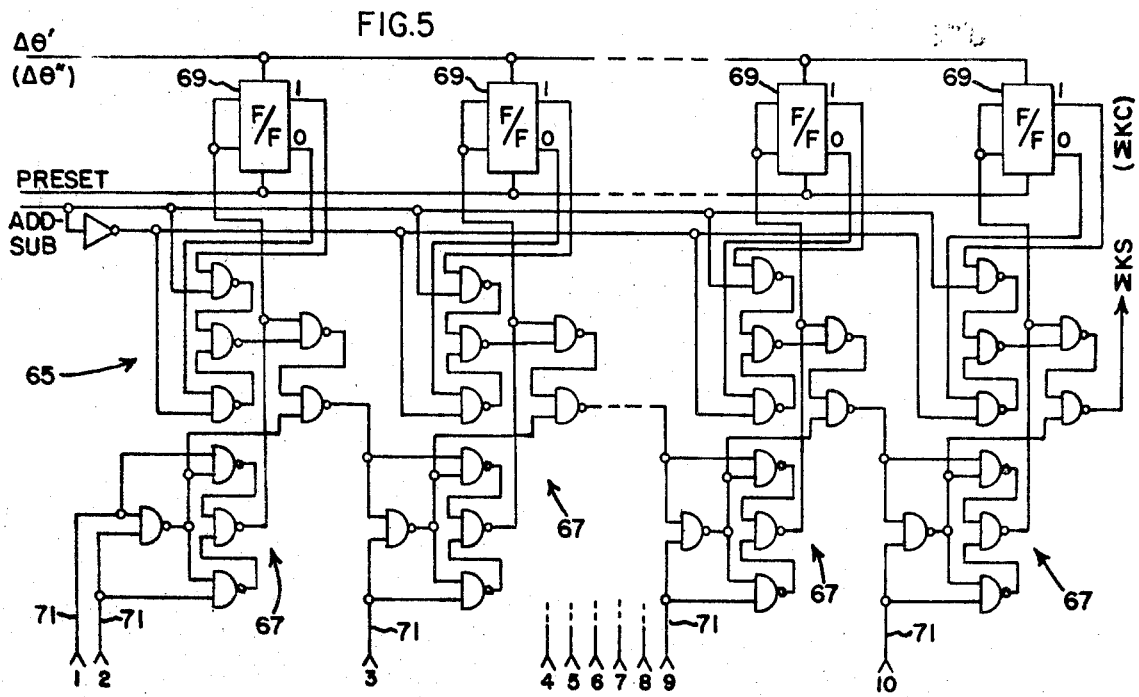

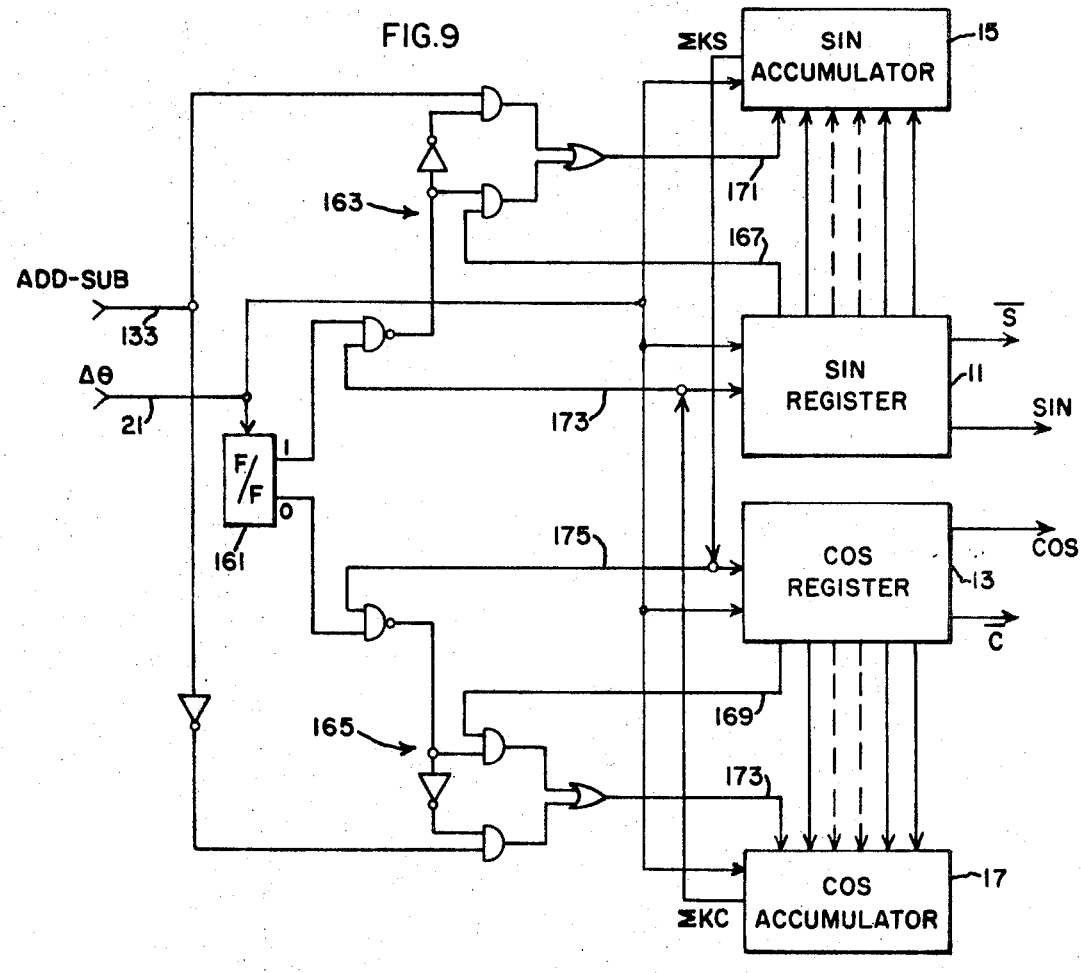

3,578,959

DIGITAL RESOLVER WITH ALTERNATELY PHASED DIGITAL DIFFERENTIAL ANALYZERS

FIELD OF THE INVENTION

The invention herein described was made in the course of or under a contract, or subcontract thereunder, with the Department of the Air Force.

This invention relates generally to resolvers for transformation of position vectors expressed in polar coordinates to the sine and cosine functions which define their positions in rectangular Cartesian coordinates. More particularly, this invention relates to systems for accomplishing such transformations using digital techniques and implementation, specifically through use of digital differential analyzers and associated digital processors arranged to produce digital output indication of the sine and cosine of a sensed angle the input measure of which is a series of pulses each representing an incremental change in magnitude of the angle.

Such resolvers find utility in many diverse applications. In radar systems, for example, Plan Position Indicator (PPI) and other X-Y displays frequently require as inputs the sine and cosine functions of the radar antenna position in azimuth. Other more conventional shaft angle sensors, such as potentiometers, synchros and encoders which are capable of generating sine-cosine functions, have limitations which often make their use impractical for this application. Measurement of angular position of a sensed object is a frequent requirement also in machine tool controls, and again the sine and cosine functions may be necessary to operation of the control.

DESCRIPTION OF THE PRIOR ART

Use of the basic digital differential analyzer technique in generating orthogonally related functions such as sine and cosine from a pulse input representing an angular position is described in many publications, and the technique has in practice been implemented in several significantly different forms. In perhaps their simplest form these known resolvers are arranged to respond to each input pulse to increment or extrapolate the values of the orthogonally related components using as a base for the extrapolation the component values as they stood just prior to the extrapolation. Extrapolation then occurs along a line which is tangential to a unit radius circle through its starting point, and as a result the new or extrapolated values will be displaced outwardly from the unit radius circle. This displacement represents an error in the magnitude function of the sine and cosine, and since each succeeding extrapolation is likewise tangential and subject to the same error, there results a cumulative error which continually increases and may after a number of incremental computations reach unacceptably high values.

Conventional resolvers employing tangential extrapolation are subject to another source of error resulting from their inability to retrace their extrapolation paths and return to prior values of sine and cosine upon reversal of the sense of the input signal, i.e., upon reversal of the direction of change of the angular position sensed. At the time of such reversal the values of sine and cosine which would be necessary to enable extrapolation back to precisely the same values as existed just prior to the reversal are not available within the digital differential analyzers, so the accuracy of the first extrapolation following each reversal suffers accordingly.

Various approaches toward elimination or reduction of these extrapolation errors are described in the literature, of which U.S. Pat. No. 2,995,302 to Ingwerson et al. is representative. As described for example in the Ingwerson patent, the computational errors which are characteristic of tangential extrapolation resolvers may be substantially reduced by means of a selective cross feed of overflow or carry signals between the accumulator registers in the digital differential analyzers, the direction of cross carry between accumulators being switched upon each reversal of direction of the input signal. Resolvers employing accumulator cross-carry alternated in this way offer significant improvement in accuracy over tangentially extrapolating resolvers, though as will be explained hereinafter they too fall short of perfect accuracy of computation, to a degree which may prove objectionable in critical applications.

SUMMARY OF THE INVENTION

The present invention has as its principal objective the provision of digital resolvers which more closely approach perfect accuracy of computation and which afford such higher degree of accuracy without corresponding additional complexity or cost over known resolvers. In accordance with the invention, the computational errors common to prior art digital resolvers are significantly reduced by accomplishing the extrapolation resulting from each pulse input in two virtually separate and distinct steps, and alternating the sequence of these two steps with each successive pulse input. Specifically, in the first step the value of either the sine or cosine function is extrapolated using the present or stored value of the other function, then the other is extrapolated using the new or extrapolated value of the first. The order or sequence of these two extrapolations is reversed upon the next input pulse, and alternated with each pulse input thereafter. Such alternate phasing of the sine and cosine extrapolations in one embodiment of the invention is effected by phase control means generating a two-phase clock input to the sine and cosine units, with the sequence of the clock inputs to these respective units being alternated with each input pulse. In another embodiment extrapolations of both functions are performed simultaneously in time, with the extrapolated values of each function needed on alternate extrapolations of the other being derived by "look-ahead" or anticipation techniques rather than by time delay of those extrapolations. In both these embodiments the error function is alternately nulled and assures an output which is theoretically unlimited and may readily be made of accuracy limited only by the bit capacities of the computational units.

BRIEF DESCRIPTION OF THE DRAWINGS

The foregoing and other objects, features and advantages of the invention will be more fully understood by reference to the appended claims and to the following detailed description when read in conjunction with the accompanying drawings, wherein:

FIG. 1 is a block diagram of one embodiment of digital resolver in accordance with the invention;

FIG. 2 illustrates the cumulative error which is characteristic of prior art resolvers utilizing tangential extrapolation of values of sine and cosine;

FIG. 3 is a similar showing illustrating the relative absence of cumulative error resulting from alternately phased extrapolation in the resolver of this invention;

FIG. 5 is a logic diagram of a digital accumulator suitable for use as one of the sine and cosine accumulators in the resolver of FIG. 1;

FIG. 6 is a logic diagram of the polarity and zero set controls for the resolver of FIG. 1;

FIG. 9 is a block and logic diagram of an alternative embodiment of the invention.

DESCRIPTION OF THE PREFERRED EMBODIMENTS

Figure 4:
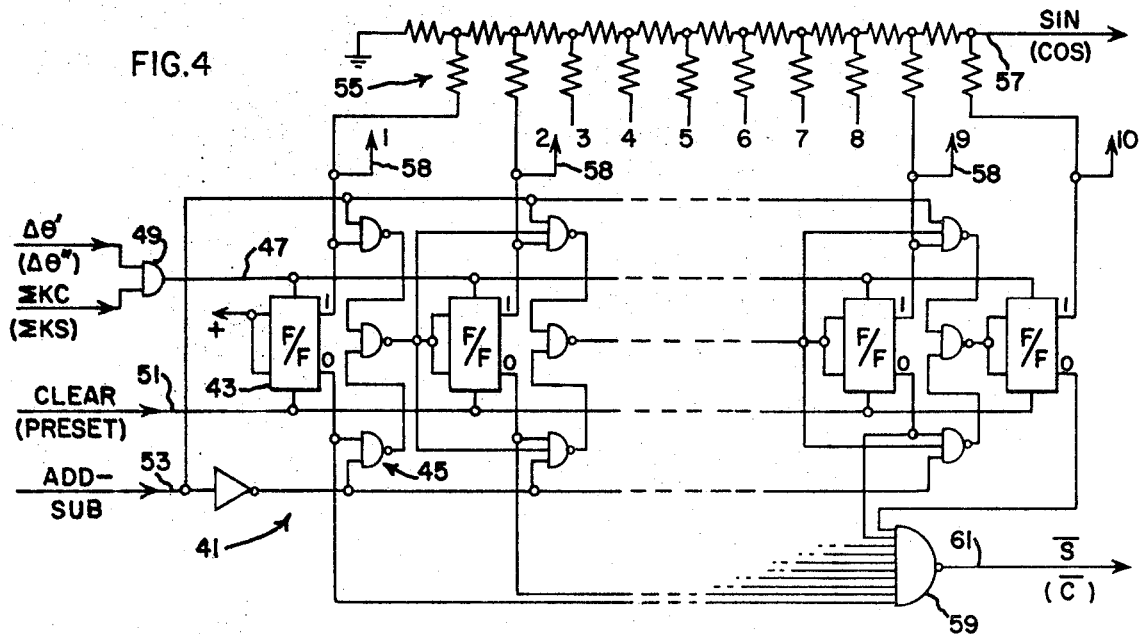
FIG. 4 is a logic diagram of a reversible binary counter suitable for use as one of the sine and cosine registers in the resolver of FIG. 1.

With continued reference to the drawings, wherein like reference numerals have been used throughout to designate like elements, FIG. 1 illustrates the digital resolver of this invention as embodied in a sine-cosine function generator. Before discussing differences which the resolver of FIG. 1 presents over prior such resolvers, certain commonalities will first be described to enable clearer understanding of the invention. In common with prior resolvers, that shown in FIG. 1 employs digital differential analyzers to generate the sine and cosine functions through incremental additions to and subtractions from existing stored values of sine and cosine, one such incremental extrapolation being accomplished in response to each $\Delta\Theta$ input pulse. These input pulses may be supplied by a pulse generator (not shown) of conventional type coupled to the sensed object or otherwise operative to produce one $\Delta\Theta$ pulse upon each incremental change $d\Theta$ in the angle sensed.

To perform such computations the resolver of FIG. 1 includes sine and cosine registers 11 and 13, respectively, a sine accumulator 15 and a cosine accumulator 17, and a polarity and zero set control 19 all interconnected with information and control inputs and outputs as shown. The magnitudes of the sine and cosine of the input angle $\Theta$ are contained in the respective registers 11 and 13 which respond to incrementing signals ($\Sigma KS$ and $\Sigma KC$) from accumulators 15 and 17, to count either up or down depending on the particular quadrant being computed and the direction of change of the angle $\Theta$. Specifically, at zero degrees and going clockwise (increasing $\Theta$), the magnitude of $\cos\Theta$ is a decreasing function while the magnitude of $\sin\Theta$ is an increasing function. At 90° the cosine reaches zero and the sine reaches unity, and if $\Theta$ continues in clockwise direction the cosine then becomes an increasing magnitude function while the sine reverses direction to become a decreasing function. Whether the registers are to count up or count down is, therefore, a function of the particular quadrant in which $\Theta$ then lies, and a function of the polarity of $\Delta\Theta$ which is in turn a function of the direction of movement of the sensed object.

The correct direction of count is sensed and controlled by the polarity control function, the inputs to which include an azimuth change pulse input which conventionally would be the $\Delta\Theta$ pulses on line 21 but which here comprises two pulses $\Delta\Theta'$ and $\Delta\Theta''$ derived from the $\Delta\Theta$ pulse as hereinafter explained. Other inputs to the polarity control include the logic level (DIR.) on line 23 representing the direction of change of the input angle measured by the $\Delta\Theta$ pulses, and a ZERO REFERENCE or "true north" input on line 25 to preset the computer units to settings corresponding to the zero angle or "true north" position. Polarity control 19 also has inputs on lines 27 and 29 from the sine and cosine registers 11 and 13, respectively, a $\overline{C}$ or $\overline{S}$ (zero level) pulse on which indicates that the corresponding register has counted down to zero. Outputs from the polarity control 19 include a CLEAR instruction to the sine register 11, a PRESET instruction to the cosine register and to the two accumulators, and ADD-SUB instructions to both registers and accumulators to control their respective directions of count.

The first time the sensed object passes its zero angle or "true north" position, the ZERO REFERENCE pulse input on line 25 will clear the sine register and cause the cosine register and the two accumulators to preset, then as the sensed object continues to rotate the resulting $\Delta\Theta$ pulses will each initiate a point-by-point incremental computation of the sine and cosine functions, in a manner such that the sine and cosine registers will at all times contain binary numbers equal to the magnitudes of sine $\Theta$ and cosine $\Theta$.

The elements thus far described together constitute a system which is conventional both in configuration and in basic mode of operation. The resolver of this invention differs from such conventional system, however, in including means—the alternate phase control 31 in FIG. 1—for introducing a time differential between the sine and cosine extrapolations and reversing the sequence of their extrapolations with each input pulse. Alternate extrapolation in this manner yields much higher accuracy of computation for reasons which will later be explained and which may be better understood by first considering the operation of a conventional resolver using tangential extrapolation, i.e., omitting the alternate phase control 31 of FIG. 1.

In such conventional arrangement and in the absence of the alternate phase control, each input pulse $\Delta\Theta$ on lead 21, representing a small fixed increment of change of angular position of the sensed object, would be transmitted directly into the sine and cosine computing units. These units then would respond simultaneously and would extrapolate their respective sine and cosine values in accordance with the following relations, in which for convenience the terms X and Y are substituted for the sine and cosine, respectively, and K is the factor by which the sine and cosine are incremented when extrapolating the cosine and sine, respectively:

$$X_{(n)} = \sin\theta_{(n)} \qquad Y_{(n)} = \cos\theta_{(n)}$$
$$\Delta X_{(n)} = K\cos\theta_{(n-1)} = KY_{(n-1)}$$
$$\Delta Y_{(n)} = K\sin\theta_{(n-1)} = KX_{(n-1)}$$
$$X_{(n)} = X_{(n-1)} + \Delta X_{(n)} \qquad Y_{(n)} = Y_{(n-1)} - \Delta Y_{(n)}$$
$$= X_{(n-1)} + KY_{(n-1)} \qquad = Y_{(n-1)} - KX_{(n-1)}$$

The conventional sequence of computations performed in accordance with these relations is shown in Table I, columns 1 and 2, from which it will be noted that in making each computation, i.e., in proceeding from any step N to step N+1, the values of X and Y are extrapolated simultaneously using the values of X and Y corresponding to step N. Such extrapolation may be called "tangential" because, as shown in FIG. 2, it is along a line 33 which is tangential to the circle 34 on which lies the starting point for the extrapolation. Each segment of the extrapolation line 33 thus will always be perpendicular to that radius 35 which projects through its starting point, and the extrapolated values of X and Y accordingly cannot fall on the circle 34 but will be in error by an amount which increases incrementally with each additional $\Delta\Theta$ step, since in each case the line along which extrapolation occurs will be tangential to the circle and normal to the radius through its starting point. This cumulative error will increase in magnitude even upon reversal of the direction of rotation of the sensed object, as is indicated in FIG. 2 by line 36 which shows that the path of the extrapolation is not retraced but rather continues to deviate increasingly from the circle.

A precise evaluation of the X and Y terms may be made if $K = \tan\Delta\theta$. The actual values of the terms thus derived, assuming $X_0 = 0$, are:

$$X_n = Y_0 \sin\left(\sum_0^n \Delta\theta_a\right)(\sec\Delta\theta)^n$$

$$Y_n = Y_0 \cos\left(\sum_0^n \Delta\theta_a\right)(\sec\Delta\theta)^n$$

$$\arctan\frac{X_n}{Y_n} = \sum_{a=0}^n \Delta\theta_a$$

$$(X_n^2 + Y_n^2)^{1/2} = Y_0(\sec\Delta\theta)^n$$

TABLE I

| N | Tangential extrapolation | | Alternate extrapolation | | | |
|---|---|---|---|---|---|---|
| | (1) $X_N$ | (2) $Y_N$ | (3) $X_N$ | (4) $Y_N$ | (5) $X_N$ (for $K=\sin a$) | (6) $Y_N$ (for $K=\sin a$) |
| 0 | 0 | 1 | 0 | 1 | 0 | 1 |
| 1 | $KY_0$ | $Y_0-KX_0$ | $KY_0$ | $Y_0-KX_1$ | $\sin a$ | $\cos^2 a$ |
| 2 | $X_1+KY_1$ | $Y_1-KX_1$ | $X_1+KY_2$ | $Y_0-2KX_1$ | $\sin 2a \cos a$ | $\cos 2a$ |
| 3 | $X_2+KY_2$ | $Y_2-KX_2$ | $X_1+2KY_2$ | $Y_2-KX_3$ | $\sin 3a$ | $\cos 3a \cos a$ |
| 4 | $X_3+KY_3$ | $Y_3-KX_3$ | $X_3+KY_4$ | $Y_2-2KX_3$ | $\sin 4a \cos a$ | $\cos 4a$ |
| 5 | $X_4+KY_4$ | $Y_4-KX_4$ | $X_3+2KY_4$ | $Y_4-KX_5$ | $\sin 5a$ | $\cos 5a \cos a$ |
| 6 | $X_5+KY_5$ | $Y_5-KX_5$ | $X_5+KY_6$ | $Y_4-2KX_5$ | $\sin 6a \cos a$ | $\cos 6a$ |
| 7 | $X_6+KY_6$ | $Y_6-KX_6$ | $X_5+2KY_6$ | $Y_6-KX_7$ | $\sin 7a$ | $\cos 7a \cos a$ |
| . | . | . | . | . | . | . |
| $n$ (odd) | $X_{(n-1)}+KY_{(n-1)}$ | $Y_{(n-1)}-KX_{(n-1)}$ | $X_{(n-2)}+2KY_{(n-1)}$ | $Y_{(n-1)}-KX_n$ | $\sin n a$ | $\cos n a \cos a$ |
| $n$ (even) | $X_{(n-1)}+KY_{(n-1)}$ | $Y_{(n-1)}-KX_{(n-1)}$ | $X_{(n-1)}+KY_n$ | $Y_{(n-2)}-2KX_{(n-1)}$ | $\sin n a \cos a$ | $\cos n a$ |

Thus the angle increases uniformly in a controlled manner, but the magnitude (radius) increases by a factor of (sec∆θ) for each angular increment. If the direction of rotation is always in a positive direction $$\sum_{a=0}^{n} \Delta\theta_a = n |\Delta\theta|$$

A quantitative measure of the computational error using tangential extrapolation in the manner of the prior art may be derived from Table IIa, in which column 1 is the number of increments (all in a positive direction), columns 2 and 3 are the calculated values of X and Y respectively, column 4 is the magnitude of the radius or $(X^2+Y^2)^{1/2}$, and column 5 is the effective angle of rotation or arc tan X/Y. These are calculated with a factor K=0.1. It may be seen that the angular increments are uniform and therefore always predictable, but the magnitude is continually increasing. In a rotation of 180° (πradians) the magnitude has increased about 17 percent.

It is true of course that the magnitude of this extrapolation error is generally a function of the magnitude of the value selected for K, and that the value of 0.1 used for K in generating Table II is larger than would normally be used in practical systems. There is a definite lower limit on the size of the K increments which can be accommodated without undue enlargement of capacities of the digital computing elements, however, and even using very small values of K the computational errors while perhaps tolerable in some applications still will substantially exceed those achievable in the resolvers of this invention.

Table IIb is a numerical analysis of operation of another prior art resolver, this one with accumulator cross-carry, using the same extrapolation factor K. The magnitude varies about 5 percent between its high and low points and returns to its initial value at the axis crossings (N≅16 and 32), so in these respects is superior to tangential extrapolation.

TABLE II (a) Tangential extrapolation (prior art)

| (1) | (2) | (3) | (4) | (5) |
|---|---|---|---|---|
| N | X | Y | $(X^2+Y^2)^{1/2}$ | $\theta\left(\arctan\frac{X}{Y}\right)$ |
| 0 | 0 | 1 | 1 | 0 |
| 1 | .1 | 1 | 1.00499 | .099669 |
| 2 | .2 | .99 | 1.01 | .199337 |
| 3 | .299 | .97 | 1.01504 | .299006 |
| 4 | .396 | .9401 | 1.0201 | .398675 |
| 5 | .49001 | .9005 | 1.02519 | .498343 |
| 6 | .58006 | .851499 | 1.0303 | .598012 |
| 7 | .66521 | .793493 | 1.03544 | .697681 |
| 8 | .744559 | .726972 | 1.0406 | .797349 |
| 9 | .817256 | .652516 | 1.04579 | .897018 |
| 10 | .882508 | .57079 | 1.05101 | .996687 |
| 11 | .939587 | .48254 | 1.05625 | 1.09636 |
| 12 | .987841 | .388581 | 1.06152 | 1.19602 |
| 13 | 1.0267 | .289797 | 1.06681 | 1.29569 |
| 14 | 1.05568 | .187127 | 1.07214 | 1.39536 |
| 15 | 1.07439 | .081559 | 1.07748 | 1.49503 |
| 16 | 1.08255 | −.025880 | 1.08286 | 1.5947 |
| 17 | 1.07996 | −.134135 | 1.08826 | 1.69437 |
| 18 | 1.06655 | −.242131 | 1.09369 | 1.79404 |
| 19 | 1.04233 | −.348785 | 1.09914 | 1.8937 |
| 20 | 1.00745 | −.453019 | 1.10462 | 1.99337 |
| 21 | .962152 | −.553764 | 1.11013 | 2.09304 |
| 22 | .906776 | −.649979 | 1.11567 | 2.19271 |
| 23 | .841778 | −.740657 | 1.12123 | 2.29238 |
| 24 | .767712 | −.824835 | 1.12683 | 2.39205 |
| 25 | .685229 | −.901606 | 1.13245 | 2.49172 |
| 26 | .595068 | −.970129 | 1.13809 | 2.59138 |
| 27 | .498055 | −1.02964 | 1.14377 | 2.69105 |
| 28 | .395092 | −1.07944 | 1.14947 | 2.79072 |
| 29 | .287148 | −1.11895 | 1.15521 | 2.89039 |
| 30 | .175253 | −1.14767 | 1.16097 | 2.99006 |
| 31 | .060486 | −1.16519 | 1.16676 | 3.08973 |
| 32 | −.056033 | −1.17124 | 1.17258 | 3.1894 |

(b) Extrapolation with accumulator cross-carry (prior art)

| 0 | 0 | 1 | 1 | 0 |
|---|---|---|---|---|
| 1 | .1 | .99 | .995038 | .100669 |
| 2 | .199 | .9701 | .9903 | .202327 |
| 3 | .29601 | .940499 | .985982 | .304922 |
| 4 | .39006 | .901493 | .982261 | .408359 |
| 5 | .480209 | .853472 | .979293 | .512506 |
| 6 | .565556 | .796916 | .977205 | .617194 |
| 7 | .645248 | .732392 | .976085 | .722227 |
| 8 | .718487 | .660543 | .975982 | .827392 |
| 9 | .784542 | .582089 | .9769 | .932469 |
| 10 | .84275 | .497814 | .978799 | 1.03724 |
| 11 | .892532 | .408561 | .981598 | 1.14151 |
| 12 | .933388 | .315222 | .985179 | 1.2451 |
| 13 | .96491 | .218731 | .989391 | 1.34788 |
| 14 | .986783 | .120052 | .994059 | 1.44973 |
| 15 | .998788 | .020174 | .998992 | 1.5506 |
| 16 | 1.00081 | −.079907 | 1.00399 | 1.65047 |
| 17 | .992815 | −.179188 | 1.00886 | 1.74936 |
| 18 | .974896 | −.276678 | 1.0134 | 1.84733 |
| 19 | .947228 | −.371401 | 1.01744 | 1.94447 |
| 20 | .910088 | −.46241 | 1.02082 | 2.0409 |
| 21 | .863847 | −.548794 | 1.02343 | 2.13676 |
| 22 | .808968 | −.629691 | 1.02515 | 2.23222 |
| 23 | .745999 | −.704291 | 1.02593 | 2.32744 |
| 24 | .67557 | −.771848 | 1.02574 | 2.42261 |
| 25 | .598385 | −.831687 | 1.02458 | 2.51791 |
| 26 | .515216 | −.883208 | 1.0225 | 2.61351 |
| 27 | .426895 | −.925898 | 1.01957 | 2.70958 |
| 28 | .334306 | −.959328 | 1.01591 | 2.80627 |
| 29 | .238373 | −.983166 | 1.01165 | 2.90373 |
| 30 | .140056 | −.997171 | 1.00696 | 3.00205 |
| 31 | .040339 | −1.00121 | 1.00202 | 3.10132 |
| 32 | −.059781 | −.995227 | .997021 | 3.20159 |

(c) Alternate extrapolation (invention)

| 0 | 0 | 1 | 1 | 0 |
|---|---|---|---|---|
| 1 | .1 | .99 | .995038 | .100669 |
| 2 | .198 | .98 | .999802 | .199357 |
| 3 | .296 | .9504 | .995428 | .301926 |
| 4 | .38808 | .9208 | .999239 | .398868 |
| 5 | .48016 | .872784 | .996145 | .502956 |
| 6 | .562637 | .824768 | .9984 | .598663 |
| 7 | .645114 | .760257 | .997077 | .70365 |
| 8 | .714688 | .695745 | .997417 | .798828 |
| 9 | .784263 | .617319 | .998073 | .90395 |
| 10 | .838152 | .538893 | .996446 | .999391 |
| 11 | .892041 | .449689 | .998978 | 1.10386 |
| 12 | .92809 | .360485 | .99564 | 1.20032 |
| 13 | .964138 | .264071 | .999648 | 1.30346 |
| 14 | .980904 | .167657 | .995129 | 1.40151 |
| 15 | .997669 | .067889 | .999977 | 1.50235 |
| 16 | .994482 | −.031877 | .994993 | 1.60284 |
| 17 | .991294 | −.131006 | .999913 | 1.70219 |
| 18 | .96828 | −.230136 | .995254 | 1.80414 |
| 19 | .945267 | −.324663 | .999468 | 1.90163 |
| 20 | .903348 | −.419189 | .99587 | 2.00526 |
| 21 | .861429 | −.505332 | .998709 | 2.10132 |
| 22 | .802282 | −.591475 | .996744 | 2.20608 |
| 23 | .743134 | −.665788 | .997759 | 2.30135 |
| 24 | .669124 | −.740102 | .997736 | 2.40652 |
| 25 | .595114 | −.799613 | .996766 | 2.50178 |
| 26 | .509201 | −.859125 | .99869 | 2.60656 |
| 27 | .423289 | −.901453 | .995887 | 2.70259 |
| 28 | .328911 | −.943782 | .999453 | 2.80625 |
| 29 | .234532 | −.967236 | .995264 | 2.90371 |
| 30 | .135463 | −.990689 | .999907 | 3.0057 |
| 31 | .036395 | −.994328 | .994994 | 3.10501 |
| 32 | −.063402 | −.997968 | .99998 | 3.20504 |

It should be noted that the primary advantage of the accumulator cross-carry technique, which is its ability to precisely retrace itself as the direction of rotation is reversed, is not apparent in Table II because all increments are in a positive direction in this table. It should also be noted that the angle covered by the first 16 increments exceeds the angle in the next 16 increments by about 0.1 radian because the angular increment variations are cumulative within a quadrant. This seriously limits the angular accuracy at intermediate angles.

In accordance with the invention, the computational errors inherent in prior art resolvers as just explained may be avoided by introduction of the alternate phase control 31, which programs an alternatively phased sequence of extrapolation of the values of sine and cosine as more fully explained hereinafter. In brief, the alternate phase control 31 effectively develops a two-phase clock the output of which includes two pulses ∆θ' and ∆θ'' displaced from each other in a time relationship which reverses or alternates in response to each input pulse ∆θ. The arrangement is such that on the first pulse input, i.e., the first ∆θ pulse, the ∆θ' pulse will lead the ∆θ'' pulse in time, and the sine unit accordingly will compute first followed later by the cosine unit. On the next succeeding ∆θ input pulse, the time relationship between the ∆θ' and ∆θ'' pulses will be reversed, the ∆θ'' pulse occurring first, and the cosine unit accordingly will compute first followed by the sine unit.

In this way the extrapolated value of sine for the first increment is first generated by computation using the stored values of sine and cosine, then this new value of the sine is used to extrapolate the new value of cosine. On the second increment, the cosine is first extrapolated from the stored values of sine and cosine, and the sine is then extrapolated using the new value of cosine. This alternate computing, with full add-subtract accumulators as will be described, assures a precise point-by-point tracking in both the clockwise and counter-clockwise direction of rotation, as diagrammatically shown in FIG. 3.

The computations by the sine and cosine units will follow the paths of the straight lines 38 in FIG. 3, in which the heavy dots 39 represent computed outputs while the corners of the paths between these dots are the intermediate computational points. It will be noted that the values of X and Y thus computed do not suffer from the cumulative error which is characteristic of the operation of tangential extrapolators as illustrated in FIG. 2, and also that with alternate extrapolation as in FIG. 3 the line paths 38 defined by the computation are retraced exactly upon reversals of rotation, without need for additional means for avoiding the reversal errors also characteristic of conventional systems.

The precise sequence of the computational steps performed by a resolver with alternate extrapolation in accordance with the invention is perhaps most easily understood by reference to Table I, columns 3 and 4 of which show these computations for several low order increments as well as for the Nth increment. Due to the reversal of the sequence in which sine and cosine extrapolations are accomplished, the Nth step will differ depending upon whether it is an odd or even $a$. as indicated in the table.

For purposes of better illustrating the nature of the relatively very small error resulting from computation of sine and cosine extrapolations in this sequence, it is helpful to set K equal to sin $a$, to thereby produce the trigonometric series set forth in columns 5 and 6 of Table I. The pattern here shows that one of terms is always precisely correct and the other is slightly smaller than the theoretical value by a factor of cos $a$. This produces a double frequency error function envelope the asymptotes of which are unity and cos $a$. Even with a K as large as 0.01, cos $a$ is approximately 0.99995 which deviates from unity by less than the least significant bit in many systems. If K equals 0.001, a set of natural trigonometric sines and cosines is produced in milliradian increments having a theoretical worst case error less than $5\times10^{17}$.

The very small magnitude of this error, even using a value of K larger than would be used in a practical case, is illustrated by the relatively small errors in the X and Y values given in Table IIc under the heading "Alternate Extrapolation." With K=0.1 as employed in formulating this table, it will be noted that the magnitude varies between 0.995 and 1.000 and never exceeds these limits, while the tangential extrapolation shows extremes of 1.000 and 1.173 and will continually increase. Alternate extrapolation produces about a 10th of the amplitude variation exhibited by the accumulator cross-carry method. Each angular increment with alternate extrapolation is arcsine $$K\pm\frac{K^2}{2}$$

which in this example is 0.1001675±0.005 radians, but the tolerance is not cumulative. Therefore the angle after N increments is 0.1001675×N with the same tolerance as a single increment. The tolerance on the angular increment in the accumulator cross-carry method is comparable, but the tolerances are cumulative within a quadrant resulting in a maximum deviation in the tabulated example of about 0.05 radians.

Turning now to implementation of alternately extrapolating resolvers in accordance with the invention, representative embodiments of the registers 11 and 13, accumulators 15 and 17, polarity control 19 and alternate phase control 31 are illustrated in FIGS. 4—7. Referring first to FIG. 4 there is shown a digital register which may serve either as the sine register 11 or as the cosine register 13 in the resolver of FIG. 1. Those inputs and outputs which are appropriate to the sine register function are shown without parentheses and those appropriate to the cosine register function are shown in parentheses, this same convention being followed throughout the remaining FIGS. of the drawing. Registers 11 and 13 as shown comprise synchronous reversible binary counters utilizing a ripple carry, and in the illustrated embodiment are of 10-bit construction with those stages corresponding to bits 3—8 being omitted in FIG. 4.

The several inputs to the register 41 indicated in FIG. 4 are derived as shown in FIG. 1. Specifically, the $\Delta\Theta'$ and $\Delta\Theta''$ pulse inputs are received from the alternate phase control 31, the $\Sigma KC$ and $\Sigma KS$ logic level inputs are from the respective accumulators 15 and 17 and are generated thereby in a manner to be explained, the CLEAR and PRESET signals are from the polarity control 19 and so also are the ADD-SUB signals, these different control signals being generated by the polarity control in a manner to be explained. The register outputs as indicated in FIG. 4 are a digital readout of the present value of SIN or COS, an analog indication of this same value if analog output is desired, and an $\overline{S}$ or $\overline{C}$ signal indicating that the value of sine or cosine is at that moment equal to zero.

Each stage of register 41 comprises a flip-flop 43 coupled to the next following stage through a logic network 45 such that the register will count up and down in straight binary fashion in response to each count pulse input on line 47. The presence of such count pulse requires coincidence in time of the $\Delta\Theta'$ or $\Delta\Theta''$ pulse with the $\Sigma KC$ or $\Sigma KS$ logic level, which constitute the inputs to an AND gate 49. In response to each such time-coincident input pair, register 41 will count either up or down under control of the ADD-SUB signal input on line 53. The CLEAR input when received on line 51 serves to set all stages to zero in the case of the sine register and to enter a value of unity in the case of the cosine register.

A resistance ladder network designated generally by reference numeral 55 converts whatever binary number is then standing in the counter to its voltage analog, to provide the analog voltage output of "SIN" or "COS" on line 57. Digital readout of this same binary number is provided to the associated accumulator by lines 58 each connecting one counter stage to the accumulator for incrementing therein as previously explained. To produce the $\overline{S}$ or $\overline{C}$ signal which indicates that the register count has reached zero, an inverting AND element 59 produces on line 61 a "zero" level output whenever all the counter stages are at zero. These $\overline{S}$ and $\overline{C}$ outputs are transmitted to the polarity control 19 and there used for purposes which will later be explained.

With reference now to FIG. 5 there is illustrated a parallel add-subtract and store unit, designated generally by reference numeral 65, which may serve as either the sine accumulator or cosine accumulator in the resolver of FIG. 1. In the interests of commonality, the same accumulator structure may be used in both roles though only one of the two outputs $\Sigma KS$ or $\Sigma KC$ in FIG. 5 would be used in each case. The inputs are the same in both, a $\Delta\Theta'$ or $\Delta\Theta''$ pulse input, an add-subtract signal from the polarity control, and the PRESET signal input from the polarity control which is used to preset the accumulator stages. The accumulator 65 comprises nine full parallel add-subtract logic stages 67 and a 9-bit accumulator register each stage of which comprises a flip-flop 69. The inputs on lines 71 to the adder are the input levels representing the binary values of SIN or COS then standing in the associated sine or cosine register and transmitted (on lines 58 in FIG. 4) from the appropriately numbered stage thereof. These inputs effectively are multiplied by K by shifting an appropriate number of places, in this case 10 binary bits; the product then is added to that standing in the accumulator register and the resulting new sum stored therein, one such multiplication and summation being accomplished once each $\Delta\Theta$ pulse.

The $\Delta\Theta$ input to each accumulator will correspond to either the $\Delta\Theta'$ or the $\Delta\Theta''$ pulse, one of which is transmitted to the clock pulse input to each of the flip-flops 69. The PRESET input acts to clear the accumulator register bits one through eight to "zero" and set bit nine to "one" whenever the sine register reaches zero. The output is the $\Sigma KS$ or $\Sigma KC$ function which constitutes the useful output of the sine and cosine accumulators, respectively. It will be noted that though 10 input bits are available in each accumulator, only nine adder stages 67 are used because input bit one is used as a carry input to the adder first stage. This performs a "round-off" function which as further explained hereinafter serves to minimize error accumulation due to fractional remainders and polarity reversal.

Turning now to the polarity control the logic diagram for which is shown in FIG. 6, this control serves to clear the sine register each time the sensed object passes through its zero angle or "true north" position, and also effects the entry of appropriate counts into the cosine register and the two accumulators at this time as well as at other times at which the sine and cosine registers pass through zero indicating a change in the quadrant being computed. This unit also controls the direction of count of the sine and cosine registers, and provides outputs indicating the polarities associated with the digital signals produced by the sine and cosine registers, the sign signal output being indicated as X-AXIS POLARITY and Y-AXIS POLARITY in FIG. 6.

A "true north" or ZERO REFERENCE pulse on lead 81 will cause the flip-flop 83 to change state and produce a "-zero" output which after being complemented to "one" by inverter 85 is transmitted to the sine register for clearing it. After the sine register clears, it will produce a zero or $\bar{S}$ signal which returns to the polarity control via lead 87, is complemented therein by inverter 89, and is transmitted then to the cosine register to preset that register to unity which of course is the value of cosine appropriate to "true north" or zero angle position. This same pulse presets both accumulators to appropriate initial values.

Referring again to the flip-flop 83, this unit additionally serves as a pulse former providing an output pulse which is independent of the width of its input pulse on line 81, and which is of duration determined by the RC time constant of a resistance-capacitance network including resistor 91 and capacitor 93 connected as shown in a feedback loop to the "-clear" input of the flip-flop. Assuming this clear input is a current sink, the normal low state of the zero output will hold the charge on the capacitor low and thus hold the clear input level also low. When the output goes high as a result of the ZERO REFERENCE pulse, capacitor 93 will charge through resistor 91 until the potential at their common connection to the clear input becomes sufficiently high to trigger that input, thus returning the flip-flop to its normal steady state condition. When this happens, the zero output goes low and thus provides the necessary discharge path for the capacitor. In this way the width of the "one" pulse at the normal zero output may be controlled to provide a pulse adequately long to assure completion of all the necessary logic and reset operations notwithstanding time delays such as introduced by the alternate phase control to be described.

The widened zero reference pulse thus generated is transmitted via lead 95 to the DC clear input of one of two polarity determining flip-flops 97 and 99 each having its clock input pulsed whenever there is coincidence in time between the $\Delta\Theta'$ or $\Delta\Theta''$ pulse received on line 101 or 102 and either the $\bar{S}$ pulse on line 87 or the $\bar{C}$ pulse on line 103. This $\bar{S}$ or $\bar{C}$ pulse is combined with $\Delta\Theta'$ or $\Delta\Theta''$ in a logic network 105 or 107 so as to produce a logic "one" at the clock input to the respective flip-flop only when a logic "zero" pulse is received on line 87 or 103 indicating a zero value of sine or cosine, thus indicating a transition from one quadrant to the next.

Since the ADD-SUB control signals to the sine and cosine registers depend not only upon the quadrant in which falls the particular angle being computed but also upon the direction of change of the angle, it is necessary to introduce an indication of the direction of this change and such is provided on line 109. The DC input signal here is of either "one" or "zero" level depending upon the direction of rotation of the object sensed. Such direction signal combines in logic networks 111 and 113 with the quadrant signals from flip-flops 97 and 99 to produce on line 115 a signal, also appearing complemented on line 117, which reflects the direction of change of the sensed angle. This signal is of form such that when combined in NAND gates 119 and 121 with the polarity signals appearing on lines 123 and 125 from the "one" and "zero" outputs of flip-flop 97, there will result on lines 127 and 129 two signals which when combined in NAND gate 131 will produce ADD-SUB signals on output line 133 for controlling the direction of count of the sine and cosine registers and accumulators. To avoid switching of the control signals at the moments of occurrence of $\bar{S}$ and $\bar{C}$ pulses, when the registers are at "zero" or "one" values, these pulses are as shown fed into NAND elements 119 and 121 in the case of the $\bar{C}$ pulse and into NAND element 131 in the case of the $\bar{S}$ pulse, in order to inhibit the polarity change until the next following pulse.

In operation of the polarity control just described, a ZERO REFERENCE pulse on line 81 is effective to clear the sine register, and the resulting $\bar{S}$ signal then presets the cosine register and the two accumulators. This zero reference signal serves also to preset the Y-axis polarity determining flip-flop 97 to its normal "positive" state if it is not already in that state, so that this and the other logic elements in the polarity control may generate and transmit control signals to the cosine and sine registers commanding them to add or subtract depending upon the quadrant in which the angle sensed happens to lie and upon the direction of its change. These elements also produce the X-AXIS POLARITY and Y-AXIS POLARITY signals indicating the signs of the outputs of the sine and cosine registers, which are absolute magnitude signals requiring these polarity signals to complete their definition of the sine and cosine functions.

Figure 7:
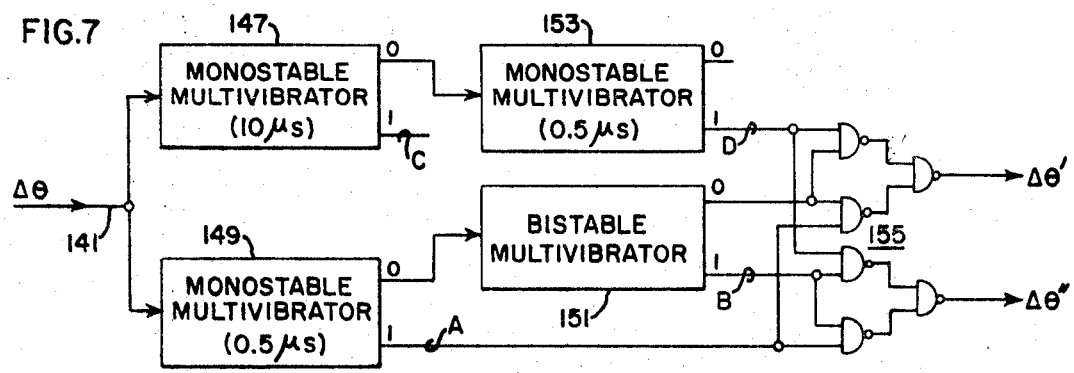
FIG. 7 is a block diagram of an alternate phase control for phasing the operation of the sine and cosine computing units in the resolver of FIG. 1.

Referring now to FIG. 7, the alternate phase control shown causes each angular increment pulse $\Delta\Theta$ received on line 141 to produce a pair of output pulses on lines 143 and 145 one of which always lags the other and the sequence of which reverses with each $\Delta\Theta$ input pulse. Thus, if a particular $\Delta\Theta$ pulse produces a coincident $\Delta\Theta'$ pulse and a lagging $\Delta\Theta''$ pulse, the next $\Delta\Theta$ pulse will generate a coincident $\Delta\Theta''$ pulse and a lagging $\Delta\Theta'$ pulse.

Figure 8:
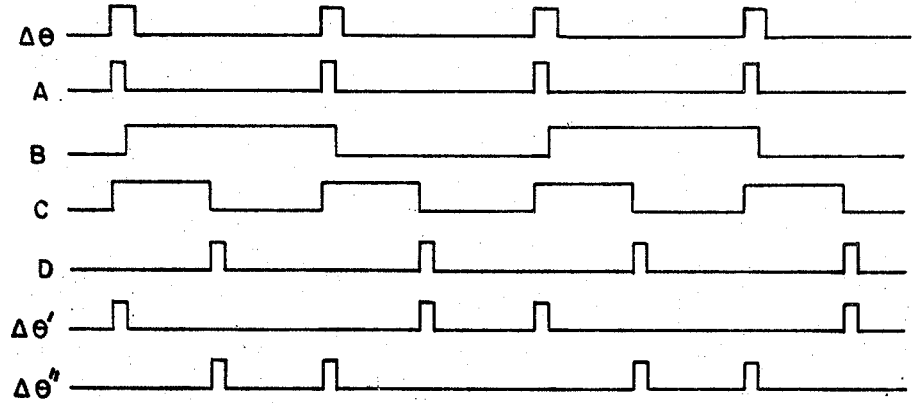
FIG. 8 is a timing diagram illustrating the operation of the alternate phase control of FIG. 7.

To accomplish this the alternate phase control of FIG. 7 includes a pair of monostable multivibrators 147 and 149 each affording a pulse width of approximately the value indicated, so that their respective responses to each input $\Delta\Theta$ pulse are as represented by waveforms A and C in the timing diagram of FIG. 8. The complement of waveform A is transmitted to a bistable multivibrator 151 to produce waveform B in FIG. 8, and the complement of waveform C is transmitted to a third monostable multivibrator 153 which produces waveform D in FIG. 8, these several waveforms being routed through a logic network comprising NAND elements connected to provide $\Delta\Theta'$ and $\Delta\Theta''$ outputs shown as the bottom two waveforms in FIG. 8.

In operation, the pulse A will be logically routed to the $\Delta\Theta'$ line if the bistable multivibrator 151 is in the zero state, i.e., if B is low on the timing diagram, or to the $\Delta\Theta''$ line if B is high, the stage of B changing at each trailing edge of pulse A. The trailing edge of pulse C's complement triggers multivibrator 153 to produce the waveform D, which also is logically routed to $\Delta\Theta'$ if B is in the zero state and to $\Delta\Theta''$ if B is high. However, since B changes state at the trailing edge of the A pulse, B will drive $\Delta\Theta''$ if A appears on the $\Delta\Theta'$ line, and vice versa. Each $\Delta\Theta$ pulse input accordingly will produce a $\Delta\Theta'$ and a $\Delta\Theta''$ spaced in time by a predetermined amount, about 10 microseconds in the particular embodiment being described, and in sequence or order which reverses with each input pulse. These $\Delta\Theta'$ and $\Delta\Theta''$ pulses then are transmitted to the sine and cosine computing units to alternately sequence the order of their computations in the manner previously described with reference to FIG. 1.

As there explained, this alternate sequencing of the extrapolation of the sine and cosine functions yields a very substantial reduction in error of the functions thus computed. The accuracy of this iterative incremental sine and cosine summation is further enhanced by the described accumulator arrangement in which input bit one is used as a carry input to the adder first stage. This provides a suitable round-off function, by giving the same weight to the most significant bit which is not carried as to the least significant bit that is carried. If the least significant bit carried has a value of 1, then the largest bit not carried has a value of one-half and the total value of all bits dropped is less than 1. The accuracy is statistically maximized if all fractions less than one-half are dropped and those of one-half or larger are considered one. This may be accomplished by sensing only the single bit having a value of one-half, since necessarily its presence will show a fraction of one-half or greater and its absence will indicate a lesser fraction. Another advantage of this technique is that the "twos complement" negative number is identically the same as the "ones complement" if the one-half bit is also complemented. Therefore no special logic will be required to correct the negative number in a bipolar system.

In the embodiment of the invention thus far particularized the sine and cosine functions are extrapolated in time-spaced sequence. It is also possible to implement the invention in a manner such that time spacing between extrapolations is merely virtual, this being accomplished by extrapolating both functions simultaneously in time but using a "look-ahead" technique in which the anticipated extrapolated value of one of the two functions is substituted for its present value, and alternating with each input pulse the function for which this substitution is made. For example, on the first input pulse the anticipated value for the sine function may be derived by sensing the carry output of the cosine accumulator to determine whether the least significant bit of the sine register to which this output is to be transmitted will be changed thereby. If so, the value of the sine function as transmitted from that register to the sine accumulator is modified accordingly, thus in effect substituting the anticipated value of the function for the actual. During the extrapolation resulting from this first input pulse the value of the cosine function used is its actual or present value, then during the extrapolation initiated by the next following $\Delta\Theta$ pulse an anticipated value for the cosine function is similarly derived and used together with the actual value of the sine function.

FIG. 9 illustrates this alternative embodiment of the invention, omitting the polarity control and its various inputs and outputs which may be essentially the same as in the embodiment of FIG. 1. As shown, each $\Delta\Theta$ input pulse on line 21 reverses the state of a flip-flop 161 which, through two logic networks 163 and 165 to be described, controls the transmission of the least significant bit LSB signals on lines 167 and 169 from the sine and cosine registers 11 and 13, respectively, to lines 171 and 173 connecting to the bit 01 inputs of accumulators 15 and 17, respectively.

On each alternate $\Delta\Theta$ pulse the LSB signal for one function is transmitted unmodified through the logic network from register to associated accumulator, while the LSB signal for the other function is transmitted with modification as necessary to anticipate the value for that function resulting from its next extrapolation. Such anticipation is introduced to the logic networks 163 and 165 by inputs from the cosine and sine accumulators on lines 173 and 175 which respectively transmit the accumulator carry outputs $\Sigma KC$ and $\Sigma KS$. The direction of change of the LSB signal as modified by the logic network is controlled by the ADD-SUBTRACT signals appearing on line 133 from the polarity control.

With the flip-flop 161 in its "zero" state or if the cosine accumulator carry output is zero, the sine LSB goes unmodified to the bit 01 input of the sine accumulator, and similarly if the flip-flop is in its "one" state or if the sine accumulator carry output is zero the cosine LSB goes unmodified to the cosine accumulator bit 01 input. If the flip-flop is in the "one" state and the cosine accumulator carry is "one," the sine accumulator input bit 01 is "one" with an ADD command and zero with a SUBTRACT command. If the flip-flop is in "zero" state and the sine accumulator carry is "one," the cosine accumulator input bit 01 is "one" for an ADD command (inverse of ADD command for sine accumulator) and "zero" for SUBTRACT command.

Since the accumulators give a weight of two to the bit 01 inputs, the total weight does not change if an odd number is increased by one or an even count is decreased by one as a result of an accumulator carry output. However, if an odd count (bit 01=1) is decreased or an even count (bit 01=0) is increased there is a net change in the quantity sensed by the accumulator. In response to a first $\Delta\Theta$ pulse, therefore, one accumulator carry output is sensed to see if it should force the opposite accumulator input bit 01 to be a "one" or "zero," and in response to the next $\Delta\Theta$ pulse the same step is performed but with respect to the opposite integrators. In this way extrapolation of both functions may be performed simultaneously while using the same values calculated in the same way and to the same accuracy as in the time phased extrapolation first described.

As will be obvious to those skilled in the art, the resolver of this invention may incorporate many variations in logic devices and implementation providing trade-offs in such parameters as speed of operation, logic package count, and power. Desired degree of accuracy may be achieved by appropriate adjustment of the number of register and accumulator bits, with corresponding adjustment of the size of the angular increments sensed. The entire resolver may be operated with any base number system and with complemented negative numbers instead of polarity and magnitude functions. If a magnitude of other than unity is used it will be preserved, so functions such as R sine $\Theta$ and R cosine $\Theta$ may be resolved. Due to the sequential nature of the utilization of the functions, serial digital computation may readily be used in lieu of the parallel computation illustrated in this particular embodiment of the invention. However implemented, resolvers utilizing alternate extrapolation of the sine and cosine functions in accordance with the invention will optimize the accuracy of this computation, by avoiding cumulative statistical errors during normal or unidirectional rotation as well as when frequent reversals of direction of rotation are encountered.

While in this description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

We claim:

1. A digital resolver for generating sine and cosine functions for an input angle the magnitude of which is measured as a number of pulses each representing an increment of change of the angle, comprising:
    a. sine and cosine digital differential analyzers each responsive to an extrapolation control signal to increment the values of sine and cosine then standing therein;
    b. means responsive to each pulse representing an incremental change in the input angle to generate first and second extrapolation control signals, said first and second control signals both corresponding to an increment of change of said angle;
    c. means connecting said control signal generating means to said digital differential analyzers, said last named means including, means for transmitting each of said first and second control signals alternately to one of said digital differential analyzers, the digital differential analyzer to which each such signal is thus transmitted being alternated with each subsequent input pulse;
    d. each of said digital differential analyzers including means responsive to said first control signal when transmitted thereto to effect a first extrapolation in which the function then standing therein is incremented using present values of both functions in the extrapolation; and further including e. means responsive to said second control signal when transmitted thereto to effect a second extrapolation in which the function then standing therein is incremented using an extrapolated value for the other function corresponding to that resulting from said first extrapolation.

2. A digital resolver as defined in claim 1 wherein said first and second extrapolation control signals are displaced from each other in time, whereby said first extrapolation is prior in time to said second extrapolation and thus makes available the extrapolated value needed therefor.

3. A digital resolver as defined in claim 1 wherein said first and second extrapolation control signals and the extrapolations responsive thereto are substantially coincident in time, and wherein the extrapolated value needed for said second extrapolation is obtained by derivation from present values of the functions.

4. A digital resolver for generating sine and cosine functions for an input angle the magnitude of which is measured as a number of pulses each representing an increment of change of the angle, comprising:
  a. first and second reversible digital registers operative to generate and store digital numbers representing values of sine or cosine by count up or down from digital numbers previously stored therein;
  b. first and second digital accumulators each operative to add or subtract an input digital number to or from a digital number generated and stored therein by previous such additions and subtractions and to provide a carry output;
  c. control means responsive to each pulse representing an incremental change in the input angle to generate two extrapolation control signals;
  d. means operatively connecting said registers and accumulators to effect a first extrapolation by transmittal of the digital number stored in said first register into said first accumulator for differential addition or subtraction therein and transmittal of any carry output resulting from such addition or subtraction in said first accumulator to said second register for incrementing the digital number stored therein;
  e. said last named means being responsive to the other of said control signals generated upon said first input pulse to effect a second extrapolation by transmittal of a digital number corresponding to that standing in said second register upon completion of said first extrapolation into said second accumulator for differential addition or subtraction therein and to effect transmittal of any carry output resulting from such addition or subtraction in said second accumulator to said first register for incrementing the digital number stored therein;
  f. said last named means being responsive to one of said control signals generated upon the input pulse following said first input pulse to effect a third extrapolation by transmittal of the digital number stored in said second register into said second accumulator for differential addition or subtraction therein and transmittal of any carry output resulting from such addition or subtraction in said second accumulator to said first register for incrementing the digital number stored therein; and
  g. said last named means being responsive to the other of said control signals generated upon the input pulse following said first input pulse to effect a fourth extrapolation by transmittal of a digital number corresponding to that standing in said first register upon completion of said third extrapolation into said first accumulator for differential addition or subtraction therein and to effect transmittal of any carry output resulting from such addition or subtraction in said first accumulator to said second register for incrementing the digital number stored therein.

5. A digital resolver as defined in claim 4 wherein said first and second extrapolation control signals are displaced from each other in time, whereby said first extrapolation is prior in time to said second extrapolation and thus makes available the extrapolated value needed therefor.

6. A digital resolver as defined in claim 4 wherein said control means comprises:
  a. pulse generator means triggered by said input pulse to provide in response to each input pulse at least two pulses one of which is time delayed with respect to the other; and
  b. switching means for selecting one of the two pulses thus related as said first control signal and the other as said second control signal, said switching means being operative to reverse the order of selection with each following input pulse.

7. A digital resolver as defined in claim 4 wherein said first and second extrapolations are substantially coincident in time and wherein said digital number corresponding to that standing in said second register upon completion of said first extrapolation is derived prior to completion thereof by sensing the carry output of said first accumulator.

8. A digital resolver as defined in claim 4 wherein said control means is responsive to each pulse representing an incremental change in the input angle to generate a control pulse and a control gate, said control gate changing state following each said control pulse;
  a. wherein said means operatively connecting said registers, accumulators and control means is responsive to said control pulse to effect transmittal of the digital number stored in said first register and modified as required by said control gate into said first accumulator for differential addition or subtraction therein and to effect transmittal of any carry output resulting from such addition or subtraction in said first accumulator to second register for incrementing the digital number stored therein;
  b. wherein said last named means is further responsive to said control pulse to effect transmittal of the digital number stored in said second register and modified as required by said control gate into said second accumulator for differential addition or subtraction therein and to effect transmittal of any carry output resulting from such addition or subtraction in said second accumulator to said first register for incrementing the digital number stored therein; and further including
  c. logic means operative in a first state of said control gate to sense the carry output from said first accumulator to determine if the least significant bit of said second register is about to change and to modify the state of said least significant bit so that the value from said second register as transmitted to said second accumulator represents the anticipated value of said second register while causing the present value of said least significant bit of said first register to be transmitted directly to said first accumulator, said logic means being further operative in a second state of said control gate to cause the present value of said least significant bit of said second register to be transmitted directly to said second accumulator and to cause the carry output from said second accumulator to be sensed to determine if the least significant bit of said first register is about to change and to modify the state of said least significant bit so that the value from said first register transmitted to said first accumulator represents the anticipated value of said first register.